Jan. 19, 1937.   J. F. FRESE   2,068,600
MEANS FOR AUTOMATICALLY RESTARTING ELECTRIC MOTORS
Filed Oct. 9, 1934   2 Sheets-Sheet 2

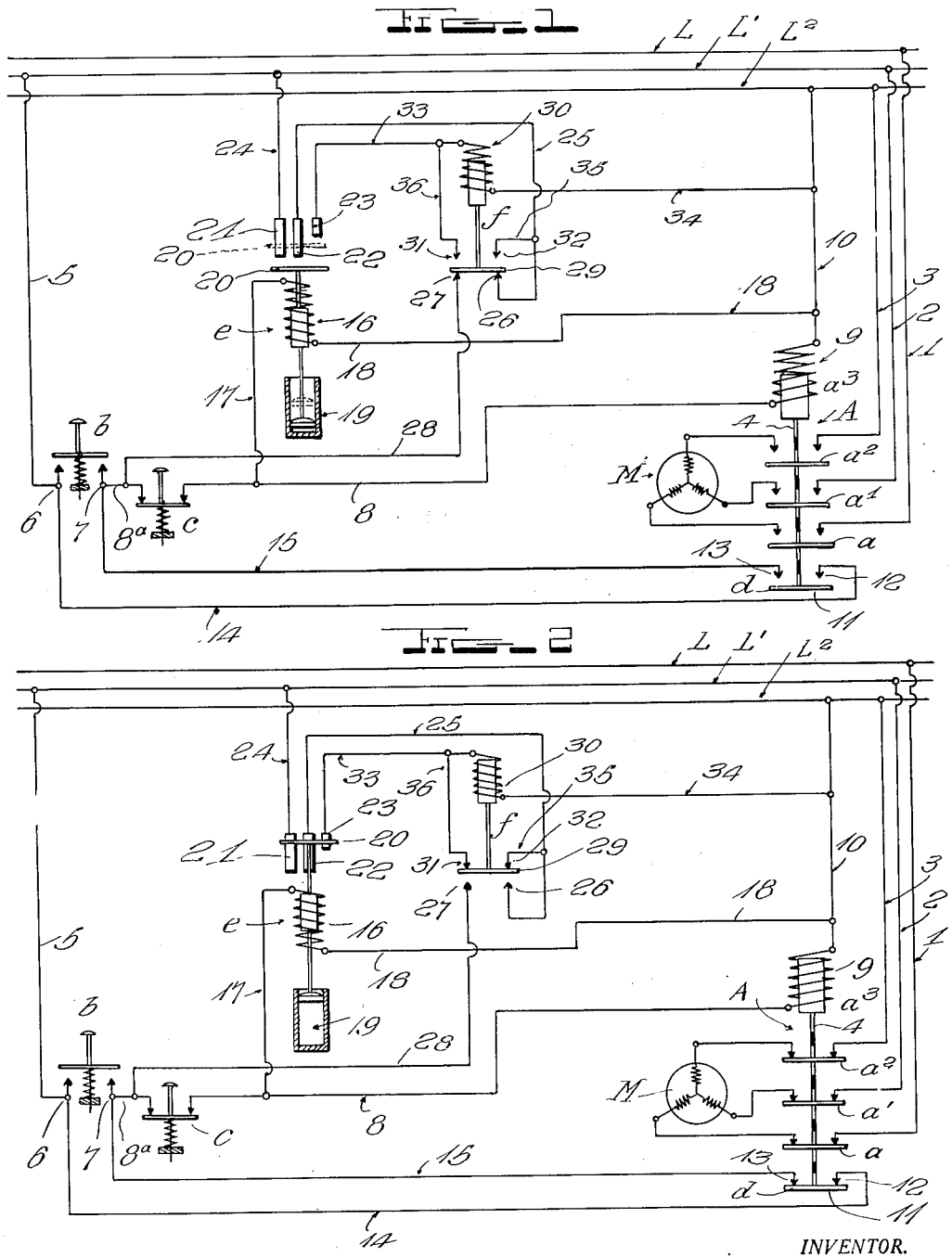

FIG. 3.

Inventor
Joseph F. Frese
By
Robert Watson
Attorney

Patented Jan. 19, 1937

2,068,600

UNITED STATES PATENT OFFICE

2,068,600

MEANS FOR AUTOMATICALLY RESTARTING ELECTRIC MOTORS

Joseph F. Frese, Baltimore, Md., assignor to Monitor Controller Company, Baltimore, Md., a corporation of Maryland Application October 9, 1934, Serial No. 747,596

10 Claims. (Cl. 175—294)

Where an electro-magnetic switch is used for connecting an electric motor to a power line, the switch automatically opens if the power fails. It is then necessary to close the circuit of the magnet by a manual operation after the power returns, in order to re-start the motor. At times the failure of power may be for only a brief interval, not long enough to allow the motor, with its load, to stop. One purpose of the present invention is to provide means for automatically closing the switch, to re-connect the motor to the supply circuit, after failure of current, if the current returns within a short pre-determined time. If the current does not return after a pre-determined lapse of time, then automatic closure of the switch will not take place.

As usually arranged, the energizing circuit for the magnet of the main switch is provided with start and stop push button switches, and a switch operated by the magnet closes a holding circuit for the magnet, in shunt to the start switch, when the main switch is closed, and this last mentioned circuit opens when the magnet is de-energized and the main switch opens.

In order to provide for re-closing the main switch automatically after it has opened by reason of failure of current in the supply circuit, I arrange an auxiliary holding circuit for the magnet of the main switch in shunt to the start switch and to the switch which controls the main holding circuit and provide means for keeping this auxiliary circuit open during normal running of the motor and for closing the auxiliary circuit upon failure of voltage in the supply circuit and for maintaining the auxiliary circuit closed for a brief pre-determined time and then opening said circuit. If the voltage fails on the power line while the motor is in operation, the main switch magnet will be de-energized and its main holding circuit and the motor circuits will be opened, but the auxiliary holding circuit will be simultaneously closed, and if the voltage returns before the latter circuit opens, the main switch magnet will be re-energized and operate to re-connect the motor to the supply circuit; but if the current does not return within the pre-determined time, the auxiliary holding circuit will be broken and it will then be necessary to start the motor, after the current returns to the lines, by manual operation of the start switch.

Another purpose of the invention is to provide means whereby if the energizing circuit for the main switch magnet is opened by the stop push button switch while the motor is running, to cause the motor to stop, the motor cannot be restarted automatically, under any circumstances, through the auxiliary holding circuit, unless the start push button switch is first operated to energize the magnet.

In the accompanying drawings,

Fig. 1 is a diagram illustrating one form of the invention, the several relay switches being in the positions which they occupy when the motor is stopped;

Fig. 2 is a similar view showing the relay switches in the positions which they occupy when the motor is running, and, Fig. 3 is a diagram illustrating a different form of the invention.

The invention is illustrated in connection with an alternating current system of distribution, although it is equally applicable to a direct current system.

Referring first to Figs. 1 and 2 of the drawings, L, L' and $L^2$ indicate the supply wires leading from a three-phase alternating current source, M indicates a motor, and A indicates an electromagnetic main switch for connecting the motor to and disconnecting it from the supply wires. This switch may be of any suitable design and is shown in the diagram as comprising three contact members $a$, $a'$ and $a^2$ for connecting the leads 1, 2 and 3, respectively, to the motor terminals, these members being mounted upon a rod 4 which is movable with the core of an electromagnet $a^3$.

The energizing circuit for the main switch magnet extends by conductor 5 from supply wire L' to the terminal 6 of a normally open starting push button switch $b$, thence, when the latter switch is closed, to terminal 7, thence through conductor $8^a$ to normally closed stopping push button switch $c$ and conductor 8 to coil 9 of magnet $a^3$, and thence by conductor 10 to supply wire $L^2$. The main switch operates an auxiliary switch $d$ for closing a holding circuit for the coil 9, this switch comprising a contact member 11, movable by the magnet, and contacts 12 and 13 connected by conductors 14 and 15 to the terminals 6 and 7 of the push button switch $b$, respectively.

It will be evident that when the power is on the line, depression of the push button switch $b$ will close the circuit through the coil of the main switch magnet by way of conductors 5, 8 and 10 and the magnet will close the motor circuits and also the switch $d$, as illustrated in Fig. 2, and when the push button is released, current will flow from the conductor 5 through holding circuit 14, 15 and switch d to conductor 8, thence through coil 9 and conductor 10 to supply wire L². When the normally closed push button switch c is depressed, the circuit to the magnet coil will be broken and the magnet will be deenergized, causing the motor to be disconnected from the supply circuit and also causing the holding circuit to be opened at the switch d.

The switches and circuits thus far described are those in common use for the distant control of electric motors.

It sometimes happens that the electric current in the power lines will fail, and in that event the main switch magnet becomes de-energized and the main switch operates to disconnect the motor from the supply wires. With the system as thus far described, it then becomes necessary for some one to depress the start push button b, after the current returns, in order to again start the motor, no matter how brief the interval in which the power is off the lines. At times the interval during which power is off the lines is very short, as where the power circuits are being switched from one generating source to another, and where the interval is so short that the motor has not ceased rotating before the return of the power, the auxiliary devices of my invention operate to maintain a circuit through the magnet coil of the main switch in shunt to the normally open push button switch and the switch d for a limited time after the power goes off, so that if the power returns within that time the magnet will be re-energized and the main switch will be automatically closed to keep the motor in rotation. If the interval during which the power is off is prolonged until the motor comes to rest, this circuit through the magnet of the main switch will be interrupted, and it will then be necessary to manually re-start the motor by depression of the start push button when the power again comes on the line.

To accomplish these ends, I provide a retarded relay e having a magnet coil 16, one terminal of which is connected by conductor 17 to the conductor 8, and the other terminal of which is connected by conductor 18 to conductor 10. This magnet coil, being connected in parallel with the coil 9 of the main switch, between the normally closed push button switch c and the conductor 10, will be energized simultaneously with the coil 9 of the main switch when the start push button b is depressed, and the circuit through coil 16 will be maintained while the switch d is closed. Also when the stop push button c is depressed the coil 16 will be deenergized at the same time that coil 9 is deenergized. The relay e is shown with a suitable retarding element 19, illustrated as a dash pot, which permits the quick upward movement of the magnet core and causes a retarded return movement when the magnet is de-energized. A switch member 20, movable with the magnet, is adapted to engage two relatively long contacts 21 and 22, and, at the end of its upward movement, a short contact 23. The contact 21 is connected by conductor 24 to the supply wire L' and the contact 22 is connected by conductor 25 to switch terminal 26 of a relay f. The other terminal 27 of the switch is connected by conductor 28 to conductor 8ᵃ, between the push button switches. The conductors 24, 25 and 28 constitute an auxiliary holding circuit for the main switch magnet. The relay f has a contact member 29 which normally bridges the contacts 26 and 27 and this contact member is movable when the relay coil 30 is energized into engagement with contacts 31 and 32. The short contact 23 of relay e is connected by conductor 33 to the coil 30 and thence by conductor 34 to conductor 10 and thence to the supply wire L². The terminal 32 is connected by conductor 35 to conductor 25 and terminal 31 is connected by conductor 36 to conductor 33.

The operation is as follows: Momentary depression of the start push button causes current to flow through the coil of the magnet of the main switch and the magnet closes the motor circuit and the switch d of the holding circuit. The magnet coil of the relay e is simultaneously emergized and this magnet quickly lifts the contact member 20 into the position shown in Fig. 2, where it bridges the three contacts 21, 22 and 23, thus connecting contacts 22 and 23 to the supply wire L' through conductor 24. Current then flows from contact 23 through conductor 33 to the coil 30 of relay f and thence through conductors 34 and 10 to the supply wire L² and the contact member 29 is lifted by the relay magnet out of engagement with the contacts 27 and 26 and into engagement with the contacts 31 and 32. This interrupts the auxiliary holding circuit between the conductors 25 and 28 and establishes connection through conductor 25 from contact 22 of relay e to the magnet coil of relay f through conductors 35 and 36 which are connected by the member 29. Hence, initially, current can flow from the contact 23 of relay e through the magnet coil of relay f, and after the latter operates to lift the bridge piece 29, current can flow also from contact 22 of relay e through the magnet coil of relay f.

If the current on the power line fails, all of the magnets will be de-energized. The core of the main switch magnet will immediately drop, opening the motor circuits and the holding switch d, and the core of the relay f will also immediately drop, breaking the connection between the conductor 25 and the coil 30 of the relay magnet, and connecting the conductor 25 with the conductor 28, completing the auxiliary holding circuit. Thus the contact 22 of the relay e will be connected through conductors 25 and 28 to conductors 8ᵃ and 8, coil 9 of the main switch magnet and conductor 10 to the supply wire L² and this circuit is completed to supply wire L' through switch member 20, which bridges conductors 21 and 22, and conductor 24 which is connected to supply wire L'. As the switch member 20 slowly descends, it leaves the short contact 23, breaking the connection from this contact through conductor 33 to the coil of relay f, but remains for a predetermined time in engagement with the longer contacts 21 and 22, thus retaining a complete auxiliary holding circuit via conductors 24, 25, 28 and 8 through the coil of the main switch magnet for a limited time after the current fails. This situation is indicated by the dotted line position of the member 20, in Fig. 1.

If the current returns to the power lines while the switch member 22 is descending and engaging only the long contacts 21 and 22, current will flow to the coil of the main switch magnet through the auxiliary holding circuit. This will cause the main switch magnet to close the motor circuit and the switch d, the latter switch completing the holding circuit 14—15 for said magnet so as to continue the motor in operation. At the same time the magnet of the relay $e$ will be energized and the contact member 20 will be quickly moved to its uppermost position wherein it engages the short contact 23, re-establishing a circuit through the magnet coil of relay $f$, whereupon relay $f$ will lift the bridge piece 29, breaking the auxiliary holding circuit and establishing the holding circuit for the magnet of the relay $f$ through conductors 25, 35 and 36.

After current failure on the power lines, if the current does not return until after the slowly descending contact member 20 has passed off the long contacts 21 and 22, then the auxiliary holding circuit through these contacts to the main switch magnet being interrupted, said magnet will not be energized upon return of the current and the main switch will remain open. To restart the motor it will then be necessary to depress the start push button after current returns to the power lines.

The timing of the relay $e$ will ordinarily be arranged so that, after failure of current, the retarded relay will maintain the auxiliary circuit to the magnet of the main switch complete while the motor is slowing down, but will open this circuit when the motor reaches such a slow speed that it would be undesirable or damaging to reclose the main switch automatically.

The arrangement described for completing a holding circuit through the coil of the main switch magnet when the current on the power lines fails and for maintaining this auxiliary circuit complete for a limited time thereafter does not interfere with the operator's control of the motor by manipulation of the start and stop push button switches. Thus, if the current is on the line and the motor is running the operator may press the stop push button switch, to stop the motor, and the motor cannot be started again until he presses the start push button switch. If the stop switch is pressed to the open position only momentarily while the parts are in the running position shown in Fig. 2, the main switch magnet will be de-energized, the motor will be disconnected from the supply circuit and the holding circuit 14—15 will be opened at the switch $d$. As the coils of the main switch magnet and of the retarded relay magnet $e$ receive current through the switch $d$ and the stop switch, both coils will remain de-energized as long as the switch $d$ is open. The relay $f$, whose coil is in an independent circuit across the line will maintain the auxiliary holding circuit for the main switch magnet open at the contacts 26 and 27 while the contact member 20 of the retarded relay is on the contacts 21 and 22, and when the member 20 passes off of the latter contacts, owing to the de-energization of coil 16, the relay $f$ will be de-energized and will bridge the contacts 26 and 27 of the auxiliary holding circuit; but before these contacts are bridged the latter circuit will be opened at the contacts 21 and 22. It will be necessary then to close the start push button switch and bridge the holding circuit 14—15 and its open switch $d$, in order to energize the main switch magnet and start the motor.

In Fig. 3 of the drawings, instead of providing a relay switch for causing a delayed opening of the auxiliary holding circuit upon failure of voltage, I have shown a switch which is closed with a quick movement by the main switch magnet when the latter is energized, and which opens with a retarded movement when the main switch magnet is de-energized, and a relay $f'$, also controlled by the main switch magnet, keeps the auxiliary holding circuit open while the motor is running normally and closes said circuit when the main switch magnet is de-energized.

As in the previously described figures, the main energizing circuit for the main switch magnet $a^3$ extends from supply wire L' through conductor 5 and the start switch $b$, conductor $8^a$ and stop switch $c$ to conductor 8, thence through coil 9 of the magnet to conductor $10^a$, and thence through conductor 3 to the supply wire L. The auxiliary holding circuit extends from conductor 5 through conductor 14 to contact 12 of switch $d$, thence through bridge piece 11, connected to the switch rod 4 to contact 13, and thence through conductor 15 to conductor $8^a$ between the start and stop push button switches, thus forming a shunt around the start switch which may be closed by the switch $d$.

In addition to the contact members $a$, $a'$ and $a^2$ for controlling the motor circuits and the contact member 11 for controlling the main holding circuit for the magnet $a^3$, a contact member or bridge piece 57 is provided on the rod 4 for controlling the circuit of the relay $f'$, as hereinafter explained.

The switch $e'$ comprises a bridge piece 40 attached to the stem 41 of a dash pot plunger 42, fitting in a dash pot cylinder 43, this bridge piece adapted to engage relatively long parallel stationary contact members 44 and 45. The stem 41 has a cylindrical part 46 at its upper end, and a cylindrical head 47, secured to the lower end of the switch rod 4 is arranged within the cylinder and movable vertically therein. A lost-motion connection is thus made between the rod 4 and the switch member 40 carried by the stem of the dash pot plunger. The arrangement is such that when the magnet A is energized it will pull the dash pot plunger and switch member 40 up quickly to close the switch $e'$; but when the magnet is de-energized the rod 4 may drop quickly to open the switches $a$, $a'$, $a^2$, $d$ and $h$, but the switch $e'$ will open slowly by gravity, retarded by the dash pot.

The auxiliary holding circuit extends from conductors 14 and 48 to contact 44, thence through switch member 40 to contact 45, thence through conductors 49 and $49^a$ to stationary contact 50 of relay $f'$, thence through movable contact 51 and stationary contact 52 and by conductors 53 and 15 to connection $8^a$ between the start and stop push button switches, thus forming a shunt around the start switch $b$ and the switch $d$ in the main holding circuit for the magnet $a$.

It will be evident that when the main switch magnet is energized, the switch $e'$ and all of the switches above it will be closed at the same time. The switch $h$ closes a circuit through the coil 64 of relay $f'$ as follows: from supply wire L' through conductors 5, 14 and 55 to stationary contact 56 of switch $h$, thence through movable contact 57 to contact 58, thence by conductor 59 to coil of relay $f'$, thence by conductors 60 and 3 to supply wire L. The relay immediately lifts its contact member 51 away from contacts 50 and 52, thus opening the auxiliary holding circuit and said member 51 then engages contacts 61 and 62, establishing a circuit through switch $e'$ and the relay switch to the coil of the relay in parallel with that established through the switch $h$. Thus, the contact 61 is connected to conductor

49, as shown, and contact 62 is connected to the coil of magnet *f'* by conductor 63.

As long as the voltage is normal and the motor is in operation the relay will keep the auxiliary holding circuit open between conductors 49 and 53. If the voltage fails, the magnet of the main switch will be de-energized and the magnet of the relay will also be de-energized. The circuit to the relay will be broken at the switch *h* and the parallel circuit through the relay coil will be broken at the relay switch, and the contact member 51 will drop into engagement with contacts 50 and 52, thus completing the auxiliary holding circuit which extends through the slow opening switch *e'*. If the voltage does not return to the supply wires before the member 40 of the switch *e'* leaves the contacts 44 and 45, then the auxiliary circuit will be broken at the latter switch and the motor will not re-start automatically. But, if the voltage returns before the switch *e'* opens, the auxiliary holding circuit being then complete through switch *e'* and the relay switch to the main switch magnet, the latter will operate to lift the rod 4 and close all of the switches connected therewith. Current will then flow through switch *h* to the relay coil and the relay will open the auxiliary holding circuit as before and close the circuit to its own coil through conductors 49 and 63, which is in parallel to the circuit to said coil through the switch *h*.

If the operator depresses the stop push button switch while the motor is operating normally, the main switch magnet will be de-energized and the switches connected directly to the rod 4 will drop open. The switch *d* will open the main holding circuit; switch *h* will open the circuit through conductor 59 to the coil of the relay magnet but since the opening of the stop switch does not cut off the current flow to the relay coil through the slow opening switch *e'* and conductors 49, 63 and 60, the relay switch member 51 will not drop but will remain in its upper position and keep the auxiliary holding circuit open at the contacts 50 and 52 until this circuit is broken at the slow opening switch *e'*, when the relay coil will be de-energized and the contact 51 of the relay will engage contacts 50 and 52 of the auxiliary holding circuit. Thus the motor cannot be re-started automatically, after the stop switch has been pressed. In order to start the motor it will then be necessary to close the main energizing circuit by depression of the start switch, whereupon the main switch magnet will close the switch *h* and complete a circuit through the relay coil.

What I claim is:

1. The combination with a current supply circuit, an electric motor, a normally open main switch for connecting the motor to the supply circuit, a magnet for closing said switch, a main energizing circuit for the magnet including a normally open start switch, a main holding circuit for the magnet in shunt to the start switch and a switch for the latter circuit controlled by the magnet to open and close with the main switch, of a normally open auxiliary holding circuit for the magnet in shunt to the holding circuit switch and start switch, and means for closing said auxiliary circuit upon failure of voltage in the supply circuit and for opening said auxiliary circuit in a pre-determined time after it has been closed, provided the voltage does not return to normal during said predetermined time.

2. The combination with a current supply circuit, an electric motor, a normally open main switch for connecting the motor to the supply circuit, a magnet for closing said switch, a main energizing circuit for the magnet including a normally open start switch, a main holding circuit for the magnet in shunt to the start switch and a switch for the latter circuit controlled by the magnet to open and close with the main switch, of an auxiliary holding circuit for the magnet in shunt to the main holding circuit switch and start switch, means for maintaining said auxiliary circuit open during normal running of the motor and means for closing said auxiliary circuit for a pre-determined limited time after failure of voltage in the supply circuit and for then opening said auxiliary circuit, provided the voltage does not return to normal during said predetermined time.

3. The combination with a current supply circuit, an electric motor, a normally open main switch for connecting the motor to the supply circuit, a magnet for closing said switch, a main energizing circuit for the magnet including a normally open start switch and a normally closed stop switch, in series, a main holding circuit for the magnet in shunt to the start switch and in series with the stop switch and a switch in the latter circuit controlled by said magnet to open and close with the main switch, of an auxiliary holding circuit for said magnet in shunt to the last mentioned switch and the start switch and in series with the stop switch, a relay adapted to hold said auxiliary circuit open during normal running of the motor and to close the latter circuit upon failure of voltage in the supply circuit, and means for opening said auxiliary circuit in a pre-determined time after it has been closed by said relay, provided the voltage does not return to normal during said predetermined time.

4. The combination with a current supply circuit, an electric motor, a normally open main switch for connecting the motor to the supply circuit, a magnet for closing said switch, a main energizing circuit for the magnet including a normally open start switch, a main holding circuit for the magnet in shunt to the start switch and a switch for the latter circuit controlled by the magnet to open and close with the main switch, of an auxiliary holding circuit for the magnet in shunt to the holding circuit switch and start switch, and a relay having its magnet coil connected to the energizing circuit between the last mentioned switches and the main switch magnet so that the relay magnet will be energized while the main switch magnet is energized, said relay adapted to connect the auxiliary holding circuit to the supply circuit during normal running of the motor and to break the latter connection in a pre-determined time after failure of current and opening of the main switch, provided the voltage does not return to normal during said predetermined time.

5. The combination with a current supply circuit, an electric motor, a normally open main switch for connecting the motor to the supply circuit, a magnet for closing said switch, a main energizing circuit for the magnet including a normally open start switch, a main holding circuit for the magnet in shunt to the start switch and a switch for the latter circuit controlled by the magnet to open and close with the main switch, of an auxiliary holding circuit for the magnet in shunt to the holding circuit switch and start switch, a relay having its magnet coil connected to the energizing circuit between the last mentioned switches and the main switch magnet so that the relay magnet will be energized while the main switch magnet is energized, said relay adapted to connect the auxiliary holding circuit to the supply circuit during normal running of the motor and to break the latter connection in a pre-determined time after failure of current and opening of the main switch provided the voltage does not return to normal during said pre-determined time, and a second relay controlled by the first mentioned relay adapted to maintain said auxiliary circuit open during normal running of the motor and to close the latter circuit upon failure of current in the supply circuit.

6. The combination with a current supply circuit, an electric motor, a normally open main switch for connecting the motor to the supply circuit, a magnet for closing said switch, a main energizing circuit for the magnet including a normally open start switch and a normally closed stop switch, a main holding circuit for the magnet in shunt to the start switch and a switch for the latter circuit controlled by the magnet to open and close with the main switch, of an auxiliary holding circuit for the magnet connected to the energizing circuit between the start and stop switches, means for maintaining said auxiliary circuit open during normal running of the motor and means for closing said auxiliary circuit for a predetermined limited time after failure of voltage in the supply circuit and for then opening said auxiliary circuit, provided the voltage does not return to normal during said predetermined time.

7. The combination with a current supply circuit, an electric motor, a normally open main switch for connecting the motor to the supply circuit, a magnet for closing said switch, a main energizing circuit for the magnet including a normally open start switch and a normally closed stop switch, a main holding circuit for the magnet in shunt to the start switch and a switch for the latter circuit controlled by the magnet to open and close with the main switch, of an auxiliary holding circuit for the magnet connected to the energizing circuit between the start and stop switches, and a relay having its magnet coil connected to the energizing circuit between the stop switch and the main switch magnet, said relay adapted to connect the auxiliary holding circuit to the supply circuit during normal running of the motor and to break the latter connection with a retarded movement in a pre-determined time after failure of current and opening of the main switch, provided the voltage does not return to normal during said predetermined time.

8. The combination with a current supply circuit, an electric motor, a normally open main switch for connecting the motor to the supply circuit, a magnet for closing said switch, a main energizing circuit for the magnet including a normally open start switch and a normally closed stop switch, a holding circuit for the magnet in shunt to the start switch and a switch for the latter circuit controlled by the magnet to open and close with the main switch, of an auxiliary holding circuit for the magnet connected to the energizing circuit between the start and stop switches, a relay having its magnet coil connected to the energizing circuit between the stop switch and the main switch magnet, said relay adapted to connect the auxiliary holding circuit to the supply circuit during normal running of the motor and to break the latter connection with a retarded movement in a predetermined time after failure of current and opening of the main switch, provided the voltage does not return to normal during said predetermined time, and a second relay controlled by the first mentioned relay adapted to maintain said auxiliary circuit open during normal running of the motor and to close the latter circuit upon failure of current in the supply circuit.

9. The combination with a current supply circuit, an electric motor, a normally open main switch for connecting the motor to the supply circuit, a magnet for closing said switch, a main energizing circuit for the magnet including a normally open start switch, a main holding circuit for the magnet in shunt to the start switch and a switch in said holding circuit controlled by the magnet to open and close with the main switch, of an auxiliary holding circuit for the magnet in shunt to the switch in the main holding circuit and to the start switch, and means controlled by said magnet for maintaining said auxiliary circuit open while the magnet is energized, for closing said auxiliary circuit when the magnet is de-energized and for opening the auxiliary circuit in a pre-determined limited time after it has been closed, provided the voltage does not return to normal during said predetermined time.

10. The combination with a current supply circuit, an electric motor, a normally open main switch for connecting the motor to the supply circuit, a magnet for closing said switch, a main energizing circuit for the magnet including a normally open start switch, a main holding circuit for the magnet in shunt to the start switch and a switch in said holding circuit controlled by the magnet to open and close with the main switch, of an auxiliary holding circuit for the magnet in shunt to the switch in the main holding circuit and to the start switch, a switch movable by the main switch magnet, when energized, to close said auxiliary circuit, a retarding device for causing slow opening of said last mentioned switch when the magnet is de-energized, and a relay controlled by the main switch magnet adapted to open said auxiliary circuit when said magnet is energized and to close said auxiliary circuit when said magnet is de-energized.

JOSEPH F. FRESE.